United States Patent [19]

Bansal et al.

[11] Patent Number: 5,146,401
[45] Date of Patent: Sep. 8, 1992

[54] APPARATUS FOR PROVIDING A UNIVERSAL INTERFACE IN A PROCESS CONTROL SYSTEM

[75] Inventors: Ravinder M. Bansal, Horsham; Amand J. Hahn, Lansdale, both of Pa.

[73] Assignee: Honeywell Inc., Minneapolis, Minn.

[21] Appl. No.: 742,263

[22] Filed: Aug. 7, 1991

Related U.S. Application Data

[63] Continuation of Ser. No. 402,954, Sep. 5, 1989, abandoned.

[51] Int. Cl.$^5$ ............................................. G06F 3/00
[52] U.S. Cl. ................................. 364/138; 364/238.3; 364/269; 364/927.93; 364/927.99
[58] Field of Search ............ 364/138, 139, 130, 238.3, 364/239, 927.93, 927.99

[56] References Cited

U.S. PATENT DOCUMENTS

| | | | |
|---|---|---|---|
| 4,246,637 | 1/1981 | Brown et al. | 364/200 |
| 4,296,464 | 10/1981 | Woods et al. | 364/200 |
| 4,509,113 | 4/1985 | Heath | 364/200 |
| 4,513,373 | 4/1985 | Sheets | 364/200 |
| 4,571,671 | 2/1986 | Burns et al. | 364/200 |
| 4,652,417 | 3/1987 | Sutherland et al. | 364/492 X |
| 4,716,523 | 12/1987 | Burrus, Jr. et al. | 364/200 |
| 4,958,270 | 9/1990 | McLaughlin et al. | 364/187 |
| 4,959,768 | 9/1990 | Gerhart | 364/187 |

Primary Examiner—Robert W. Beausoliel
Assistant Examiner—Allen M. Lo
Attorney, Agent, or Firm—A. A. Sapelli; W. Udseth; A. Medved

[57] ABSTRACT

A plant control system includes a plant control network for performing the overall supervision of a process being controlled. The plant control network has at least one external bus for operatively connecting a corresponding interface apparatus to the plant control network. Further, each interface apparatus interfaces with at least one predetermined field device, each field device being a type having a corresponding predetermined signal type. The interface apparatus comprises a controller for controlling the input/output (I/O) of the interface apparatus. At least one I/O module, connected to the controller, preprocesses information signals to and from the predetermined field device connected to the I/O module. The preprocessing is a translation between the signal type of the field device and signals compatible with the controller.

5 Claims, 5 Drawing Sheets

APPARATUS FOR PROVIDING A UNIVERSAL INTERFACE IN A PROCESS CONTROL SYSTEM

This is a continuation of application Ser. No. 402,954, filed on Sept. 5, 1989, now abandoned.

RELATED APPLICATIONS

The present application is related to the following:

(a) patent application Ser. No. 07/299,857, entitled "APPARATUS FOR TRACKING PREDETERMINED DATA FOR UPDATING A SECONDARY DATA BASE," by P. Gerhart, filed on Jan. 23, 1989;

(b) patent application Ser. No. 07/299,859, entitled "METHOD FOR CONTROL DATA BASE UPDATING OF A REDUNDANT PROCESSOR IN A PROCESS CONTROL SYSTEM," by P. McLaughlin et al, filed on Jan. 23, 1989;

(c) patent application, Ser. No. 07/259,064, entitled "A PRECISION A/D CONVERTER UTILIZING A MINIMUM OF INTERFACE INTERCONNECTIONS," by K. Kummer, filed on Oct. 18, 1988;

(d) patent application Ser. No. 07/153,753, entitled "APPARATUS AND METHOD FOR DETECTION OF AN OPEN THERMOCOUPLE IN A PROCESS CONTROL NETWORK," by K. Kummer, filed on Feb. 8, 1988;

(e) patent application Ser. No. 07/147,962, entitled "APPARATUS AND METHOD FOR COMPENSATION OF CIRCUIT GAIN ERRORS IN A PROCESS CONTROL NETWORK," by K. Kummer, filed on Jan. 25, 1988;

(f) patent application Ser. No. 07/121,561, entitled "APPARATUS AND METHOD FOR IDENTIFICATION OF MESSAGE INITIATION IN A PROCESS CONTROL NETWORK," by P. Gerhart et al, filed on Nov. 17, 1987;

(g) patent application Ser. No. 07/121,548, entitled "APPARATUS AND METHOD FOR A SECURE AND DIAGNOSABLE ANTI-JABBER COMMUNICATION CIRCUIT," by P. Gerhart, filed on Nov. 17, 1987;

(h) U.S. Pat. No. 4,607,256, issued on Aug. 19, 1986, (reissue applied for, reissue Ser. No. 07/186,230, filed on Apr. 26, 1986); and (i) U.S. Pat. No. 4,296,464, issued on Oct. 20, 1981; all of above assigned to Honeywell Inc., the assignee of the present application.

BACKGROUND OF THE INVENTION

This invention relates to an apparatus for interfacing a plurality of signals to a processor, and more particularly, to an interface apparatus for interfacing a selectable plurality of different types of signals to a process control system.

In present day process control systems, interface devices are utilized to couple predetermined types of signals to the process control system, the predetermined types of signals being high-level analog, low-level analog, digital, . . . . Because of a rigid structure of these present day interface devices, only predetermined types of signals are permitted to be coupled to these present day interface devices. Also, the rigid structure provides only a predetermined number of control loops and secondly, only a predetermined number of input/output (I/O) for the control loops. Because some control tasks are more control processing intensive than others, and some tasks are more I/O intensive than others, it is desirable to interface selective tasks to the process control system via the interface device which will insure effective and efficient completion of these tasks, i.e. control processing and I/O. However, the configuration provided by the structure of these present day interface devices is essentially fixed, i.e., restricting what the user can do to efficiently tailor the configuration to specific user requirements, thereby limiting the number and types of tasks which can be coupled to the interface device.

The interface apparatus of the present invention permits a flexible quantity of different types of I/O signals to be interfaced (to the process control system) via the interface apparatus due to the architecture of the interface apparatus which essentially separates the processing of control from the I/O of control, thereby permitting the user to configure the system to meet a defined control strategy, without the limitations imposed by previous systems. Further, the processing of control can be eliminated altogether in the interface apparatus of the present invention. In this case the processing of control is performed by a controller external to the interface apparatus, thus permitting the interface apparatus to function as a data aquisition unit, thereby adding to the configuration flexibility.

SUMMARY OF THE INVENTION

Therefore, there is provided by the present invention, an apparatus for interfaces a plurality of signals to a processor. In a process control system, there is a plant control network for performing the overall supervision of a process being controlled. The plant control network has at least one external bus for operatively connecting a corresponding interface apparatus to the plant control network. Further, each interface apparatus interfaces with at least one predetermined field device, each field device being a type having a corresponding predetermined signal type. The interface apparatus comprises a controller, operatively connected to the bus for controlling the input/output (I/O) of the interface apparatus. At least one I/O module, operatively connected to the controller, preprocesses information signals to and from the predetermined field device connected to the I/O module. The preprocessing includes translating between the signal type of the field device and signals compatible with the controller.

Accordingly, it is an object of the present invention to provide an apparatus for interfacing a plurality of signals to a processor apparatus.

It is another object of the present invention to provide an apparatus for interfacing a plurality of different types of signals to a process apparatus.

It is still another object of the present invention to provide an apparatus for interfacing a plurality of different types of signals to a process control system.

It is a further object of the present invention to provide an apparatus for interfacing selectable quantities of different types of signals to a processor apparatus.

It is still a further object of the present invention to provide an apparatus for interfacing selectable quantities of different predefined types of signals to a processor apparatus.

It is yet another object of the present invention to provide an apparatus for interfacing selectable quantities of different predefined types of signals to a processor apparatus, wherein the selection of the signals is made by a user.

These and other objects of the present invention will become more apparent when taken in conjunction with the following description and attached drawings, wherein like characters indicate like parts, and which drawings form a part of the present application.

DETAILED DESCRIPTION

Figure 1:
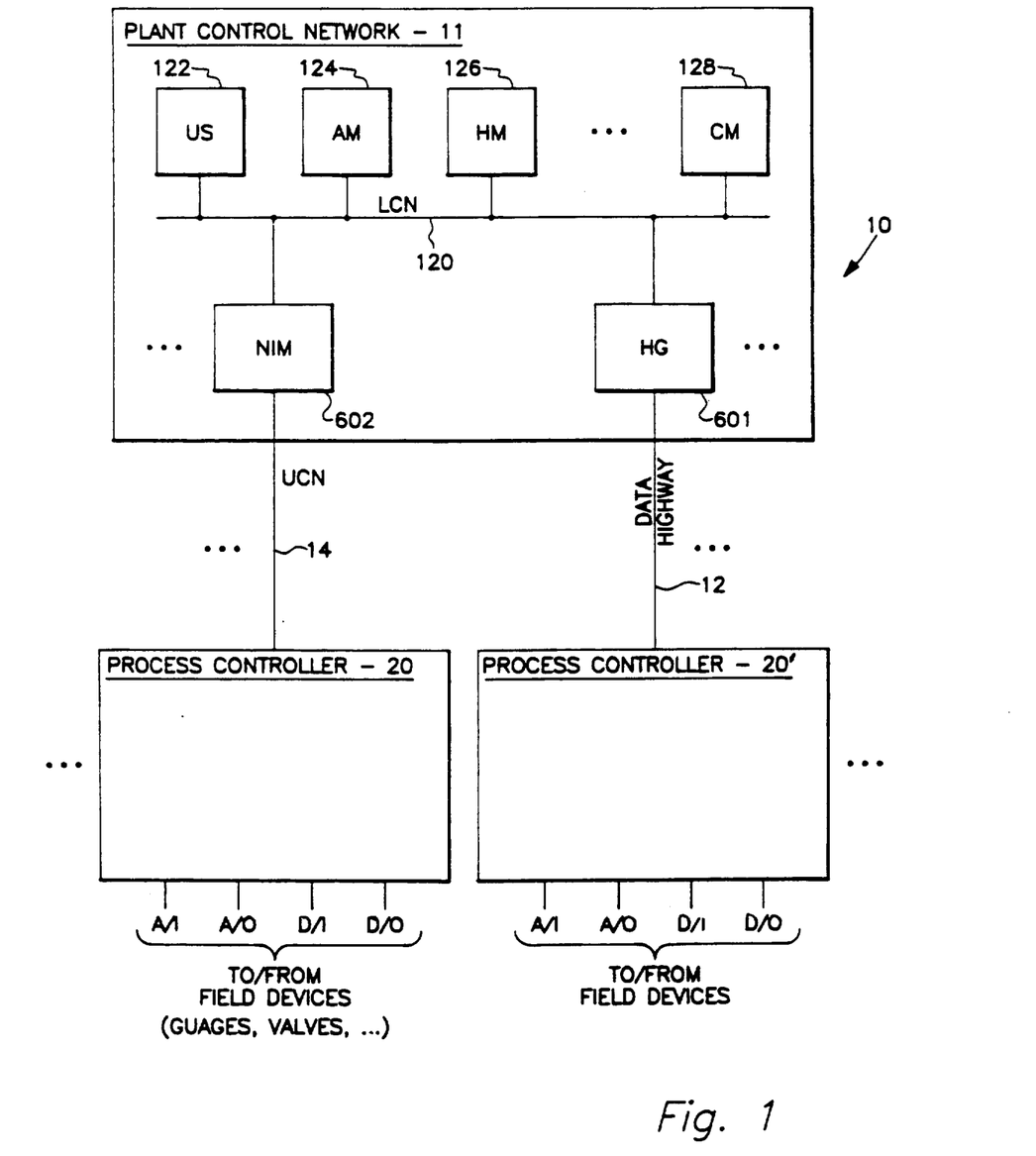
FIG. 1 shows a block diagram of a process control system in which an interface apparatus of the present invention may be utilized.

Before describing the interface apparatus of the present invention, it will be helpful in understanding a system environment in which the interface apparatus can be utilized. Referring to FIG. 1, there is shown a block diagram of a process control system 10 in which the interface apparatus of the present invention can be found. The process control system 10 includes a plant control network 11, and connected thereto is a data highway 12, which permits a process controller 20' to be connected thereto. In the present day process control system 10, additional process controllers 20' can be operatively connected to the plant control network 11 via a corresponding highway gateway 601 and a corresponding data highway 12. A process controller 20, the interface apparatus of the present invention, is operatively connected to the plant control network 11 via a universal control network (UCN) 14 to a network interface module (NIM) 602. In the preferred embodiment of the process control system 10, additional process controllers 20 can be operatively connected to the plant control network 11 via a corresponding UCN 14 and a corresponding NIM 602. The process controllers 20, 20' interface the analog input and output signals, and digital input and output signals (A/I, A/O, D/I, and D/O, respectively) to the process control system 10 from the variety of field devices (not shown) which include valves, pressure switches, pressure gauges, thermocouples, . . . .

The plant control network 11 provides the overall supervision of the controlled process, in conjunction with the plant operator, and obtains all the information needed to perform the supervisory function, and includes an interface with the operator. The plant control network 11 includes a plurality of physical modules, which include a universal operator station (US) 122, an application module (AM) 124, a history module (HM) 126, a computer module (CM) 128, and duplicates of these modules (and additional types of modules, not shown) as necessary to perform the required control/supervisory function of the process being controlled. Each of these physical modules is operatively connected to a local control network (LCN) 120 which permits each of these modules to communicate with each other as necessary. The NIM 602 and HG 601 provide an interface between the LCN 120 and the UCN 14, and the LCN 120 and the data highway 12, respectively. A more complete description of the plant control network 11, and the physical modules can be had by reference to U.S. Pat. No. 4,607,256, referred to above as related application (h). A more complete description of the process controller 20' can be had by reference to U.S. Pat. No. 4,296,464, referred to above as related application (i).

Figure 2:
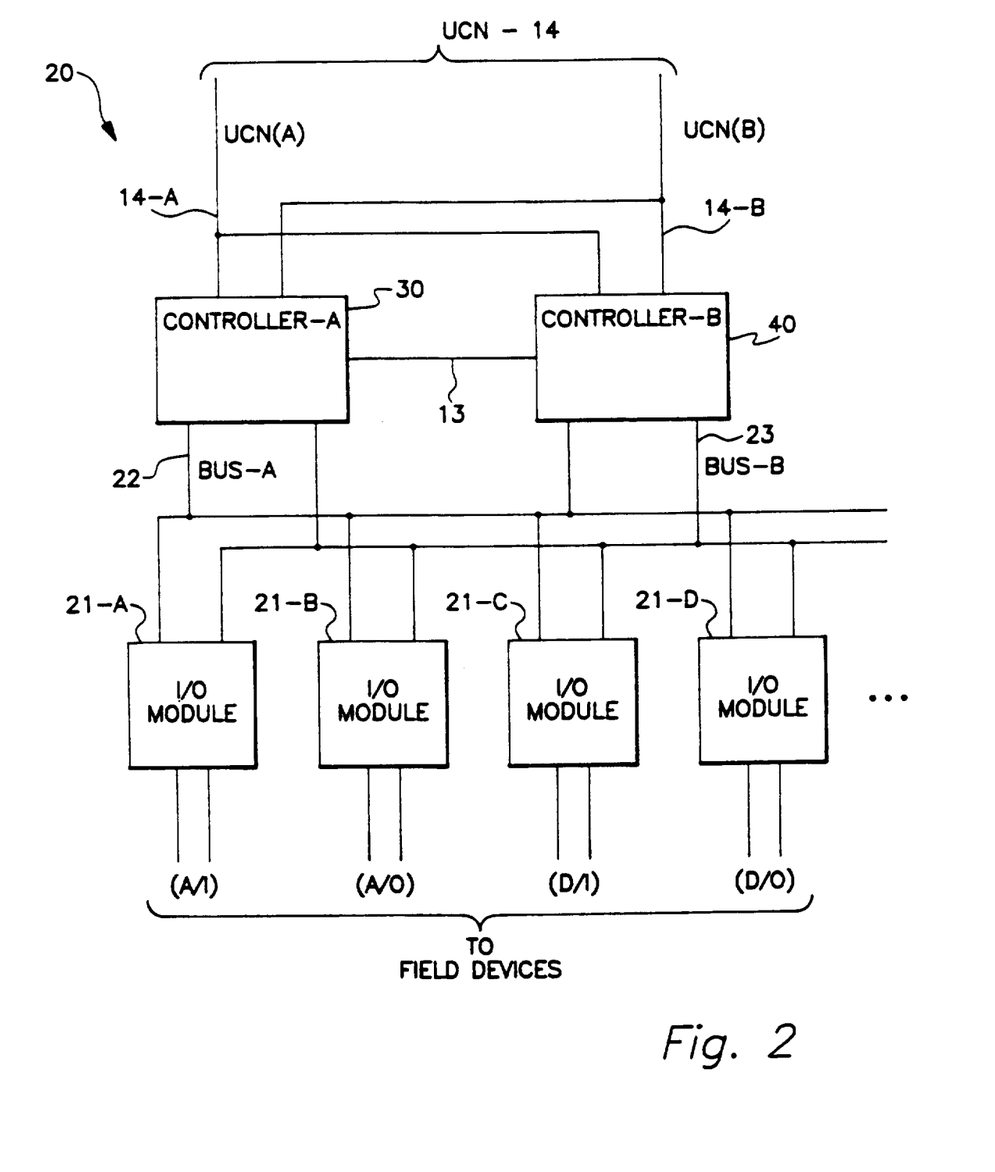
FIG. 2 shows a block diagram of a process controller, the preferred embodiment of the interface apparatus of the present invention.

Referring to FIG. 2 there is shown a block diagram of the process controller 20, i.e., the interface apparatus of the present invention. The process controller 20 of the preferred embodiment of the present invention includes a controller A 30 and a controller B 40, which effectively operate as a primary and secondary controller. Controller A 30 and controller B 40 are connected to the UCN 14, the UCN 14 in the preferred embodiment of the present invention comprising for communication redundancy purposes, a UCN(A) 14A and a UCN(B) 14B. Input output (I/O) modules 21 interface to field devices, field devices being various valves, pressure switches, pressure gauges, thermocouples, . . . which can be analog inputs (A/I), analog outputs (A/O), digital inputs (D/I), and digital outputs (D/O). The controller A 30 interfaces to each I/O module 21 via a bus A 22, and controller B 40 interfaces to each I/O module 21 via a bus B 23. In addition, once again for communication redundancy purposes, controller A 30 is also connected to bus B and controller B 40 is connected to bus A 22.

Controller A and controller B, 30, 40, can communicate with each other via three mediums, the UCN 14, a link 13 between the controllers, and the buses A, B, 22, 23, bus A and bus B in the preferred embodiment of the present invention being serial I/O links. One controller (controller A 30 or controller B 40) operates as a primary controller and the other controller operates as a secondary controller (in more of a reserve mode than a back-up, in that if a failure of controller A 30 should occur, controller B is ready to take over the control function with essentially no start-up or initialization time). On a predetermined time basis, point processing is performed by the controller designated as the primary controller and communicates with the I/O modules 21. In addition, the controller acting as the primary controller communicates with the plant control network 11 reporting status, history, and accepting inputs from the plant control network such as commands from the operator via the universal station 122. In addition, a data base maintained by the primary controller is communicated to the secondary controller via link 13. Updating of the data base in the secondary controller is further described in the aforementioned related applications (a) and (b). In the preferred embodiment, as mentioned above one controller operates as a secondary controller; however, it will be understood by those skilled in the art that a secondary controller is not necessary for the process controller 20. In the preferred embodiment of the present invention, the secondary controller is optional and operates in a mode intended by the invention. It will further be understood by those skilled in the art that various configurations can exist for interfacing the controllers A, B 30, 40 to the UCN 14A, 14B. Controller A 30 can be interfaced to UCN 14A and controller B 40 can be interfaced to UCN 14B; however, in this case a bus (UCN) event that causes UCN A 14A to fail can cause a switch-over to the backup controller, i.e., controller B 40. But in the preferred embodiment, controller A 30 is connected to both UCN 14A and 14B.

Likewise, controller B 40 is connected to both 14A and 14B. In this configuration, a communication event does not force the system to a processor failover situation.

Figure 3:
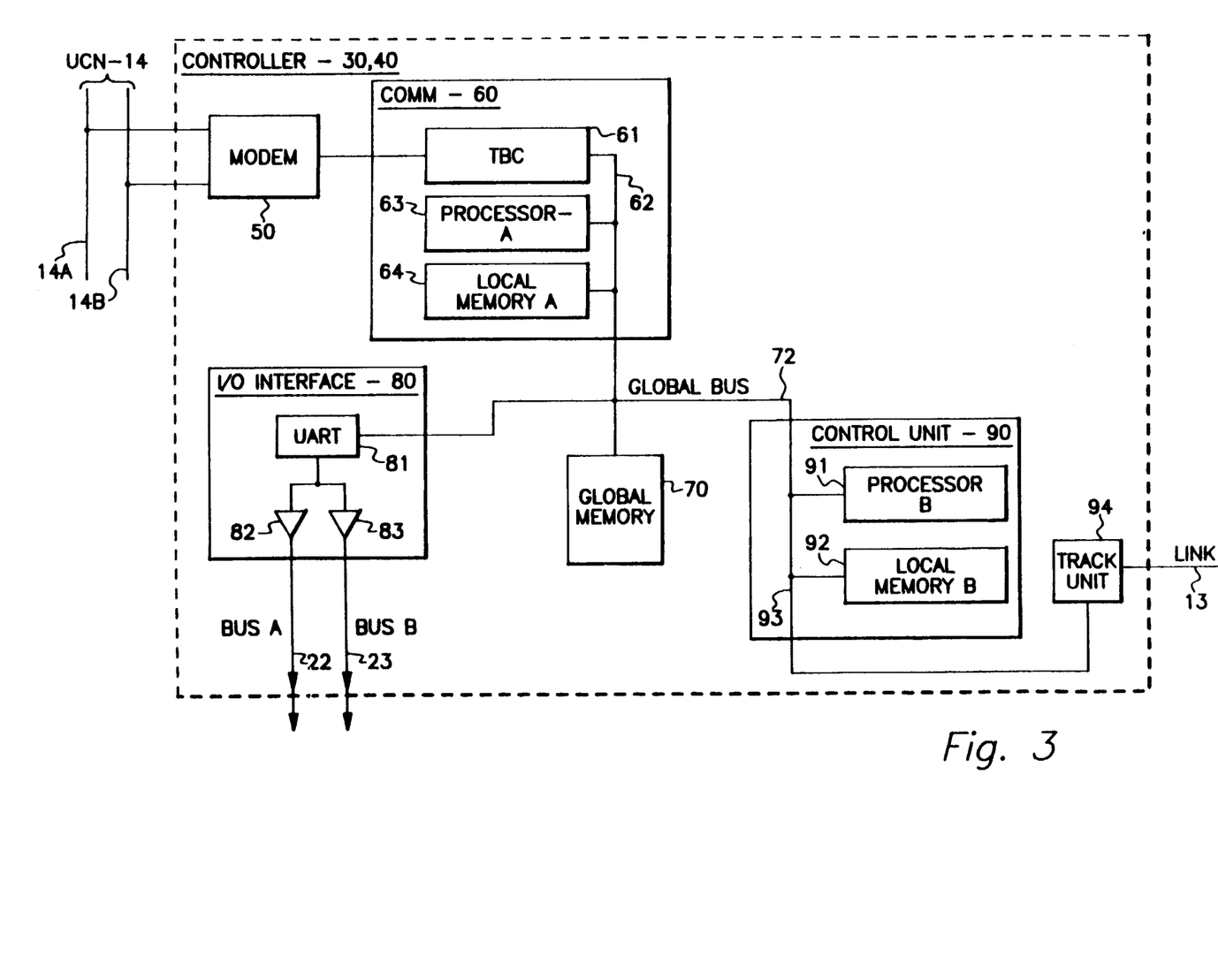
FIG. 3 shows a block diagram of a controller of the process controller of the preferred embodiment of the present invention.

Referring to FIG. 3, there is shown a block diagram of the controller 30, 40. A modem 50 is connected to the UCN 14, the modem having two inputs, one connected to UCN 14A and the other connected UCN 14B. In preferred embodiment of the present invention, the modem is a Concord Data Systems 5 mega-bit carrier band modem having two ports which allows interfacing with both UCN 14A and UCN 14B. The modem interfaces with a communication unit (COMM) 60 which in turn interfaces with a global memory 70, an I/O interface unit 80, and a control unit 90 via global bus 72. The communication unit 60 includes a communication control unit, in the preferred embodiment a token bus controller (TBC) 61, Motorola type 68824, which is connected to a local bus 62. Connected to the local bus 62 is a processor A 63 (which essentially performs the communication function) and a local memory A 64. The processor A 63 via the TBC 61, communicates with the plant control network 11 via modem 50. The local memory A 64 stores information, including personality image which is downloaded from the plant control network 11, for use by processor A 63 and TBC 61. The global memory 70 stores information which is common to both processors A63 and B 91. It also stores all the data received from bus A 22 and bus B 23. The global memory 70 also serves as an interprocessor communication vehicle between processors A 63 and B 91. Control unit 90 includes a processor B 91 and a local memory B 92. Processor B 91 performs the control function (i.e., control processing) relating to the field devices. This essentially includes performing the point processing, and updating the local memory B 92 and global memory 70. Also coupled to the local bus 93 of control unit 90 is a track unit 94 which is utilized to implement the data base transfer via link 13 to the other controller 30, 40 of the process controller 20. A more detailed description of the track unit 94 can be had by making reference to the related patent applications identified above as related applications (a) and (b). The I/O interface unit 80 includes a receiver-transmitter device, in the preferred embodiment of the present invention this device being a UART (Universal Asynchronous Receiver/Transmitter) 81. In the preferred embodiment of the present invention the UART utilized is a circuit within the Intel 80C31 microcontroller. The UART 81 is coupled through drivers 82, 83 to bus A 22 and bus B 23, respectively. (As mentioned previously, control unit 90 can be eliminated, the control processing being performed by another processor within the plant control network 11, such as AM124. In this configuration, the interface apparatus of the present invention functions as a data acquisition unit).

Processor B 91 receives data from the various field devices through global memory 70, performs the necessary point processing and control function, and then updates the local memory B 92 and global memory 70, as required. The communication unit 60, in response to commands from the control unit 90 via global memory 70, inputs and outputs data between the I/O modules 21 (via the I/O interface unit 80) and the global memory 70, thereby relieving the control unit 90 from the burden of I/O module management. In this manner the control processing is performed by the control unit 90 within the process controller 20 for the predefined attached field devices, and the communication (i.e. the I/O control) is handled by the communication unit 60 through the UART 81.

Figure 4:
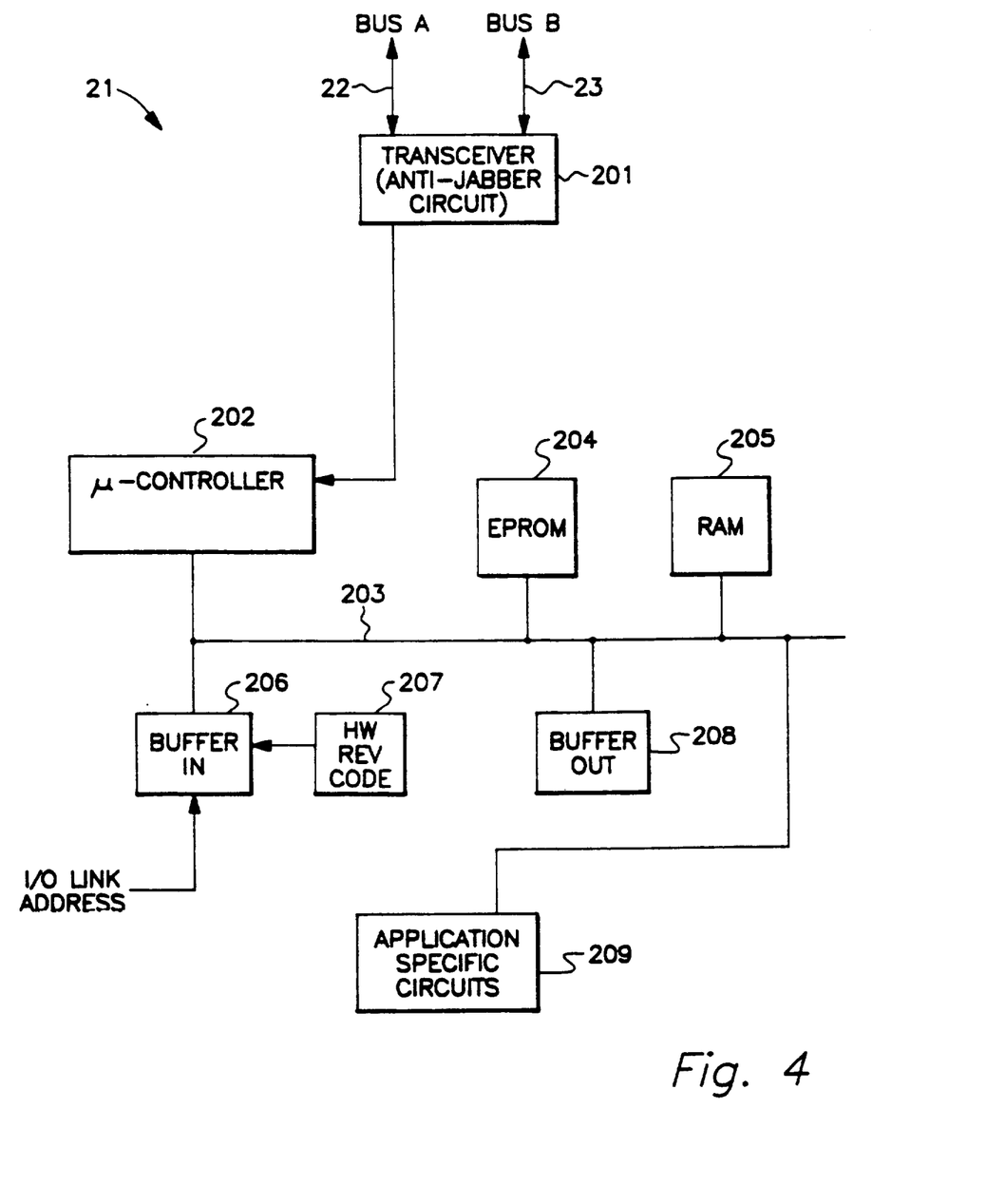
FIG. 4 shows a block diagram of the I/O module of the preferred embodiment of the present invention.

Referring to FIG. 4 there is shown a block diagram of the I/O module of the preferred embodiment of the present invention. A transceiver (anti-jabber circuit) 201 interfaces with bus A 22 and bus B 23. The transceiver of the preferred embodiment of the present invention is of the type described in the aforementioned related application identified as related application (g) and (f). The transceiver 201 interfaces with a microcontroller (u-controller) 202. In the preferred embodiment of the present invention the microcontroller 202 is of the type, Intel 80C31. The microcontroller is coupled to a local bus 203, and includes an EPROM 204 and a RAM 205 also attached to the local bus 203. The RAM 205 contains the information which forms the database for the I/O module 21. The EPROM 204 contains the program information utilized by the microcontroller 202. (It will be recognized by those skilled the art that the EPROM and RAM comprise a memory unit and any type memory unit which can interface with the microcontroller 202 may be utilized.) Also attached to local bus 203 is an input buffer which receives the I/O link address information from the I/O link (bus A, bus B, 22, 23). Connected to the input buffer (BUFFER IN) 206 is a hardware revision code unit 207 which identifies the hardware and revision of the I/O module 21 which can be read by the microcontroller 202 in order to verify the revision of the hardware. The output buffer (BUFFER OUT) 208 is also connected to the local bus 203. The application specific circuits 209 is also connected to the local bus 203 and interfaces with the input and output buffers 206, 208, and the microcontroller 202 via the local bus 203. The application specific circuits vary from I/O module to I/O module depending on the field device to which the I/O module is to be coupled. If the field device is of a type which requires a digital input, then the application specific circuit 209 will include the logic in order to place the digital input into a predefined format which will interface with the remainder of the I/O module. Likewise, if the field device is such that requires an analog input, then the application specific circuit contains a logic which converts the analog input signal (via an A/D converter) into a format again consistent with predefined formats. In this manner, the I/O modules are referred to as a specific I/O module type. The microcontroller 202 performs the I/O processing (or processing) for the application specific circuits 209. The programming will vary from each I/O module 21 depending on the type (i.e., A/I, A/O, ... ) the preprocessing essentially consisting of translating the signals from the application specific circuits to a format compatible with the controller 30, 40 (and more specifically with control unit 90), and putting the signals from controller 30, 40 in a format compatible with the I/O module 21. Some of the preprocessing performed includes zero drift, linearization (linearizing thermocouples), hardware correction, compensation (gain compensation and zero compensation), reference junction compensation, calibration correction, conversion, checking for alarms (limits) ... and generating a signal in a predetermined format having predetermined scale (i.e., engineering units, normalized units, percent of scale, ... ). In the preferred embodiment of the present invention seven types of applications specific circuits are provided for, these include a high level analog input, low level analog input, analog output, digital input, digital output, smart transmitter interface, and pulse input counter. For example, a detailed description of the low level analog input application specific circuit can be had by reference to the related application identified above as related application (c), and also to related applications (d) and (e).

Figure 5:
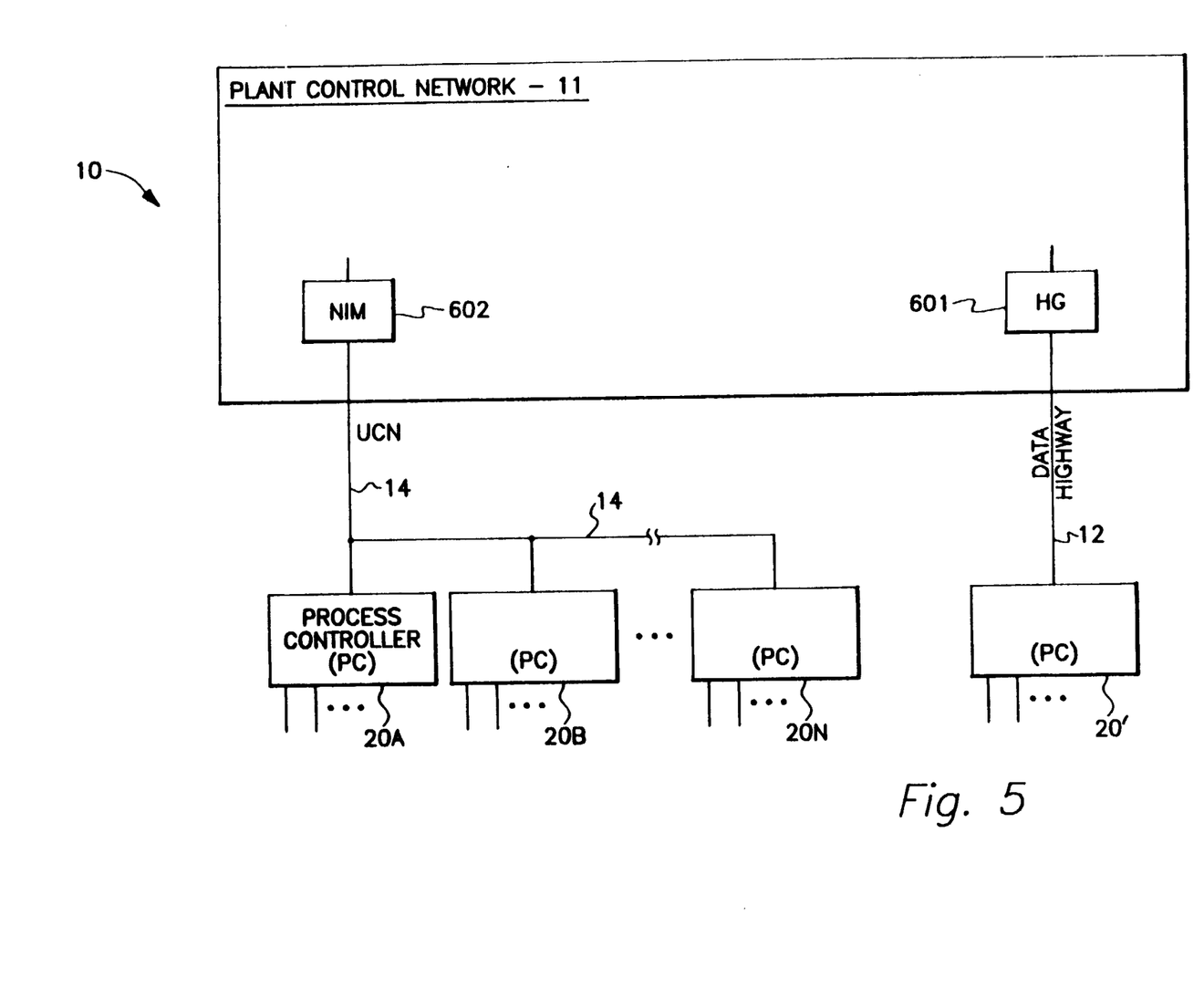
FIG. 5 shows a block diagram of an alternative embodiment of a process control system incorporating the interface apparatus of the present invention.

Referring to FIG. 5, there is shown a block diagram of an alternative embodiment of a process control system incorporating the interface apparatus of the present invention. The network interface module (NIM) 602 is coupled to the universal control network (UCN) 14. Also coupled to the UCN 14 is a plurality of process controllers (PC) 20A, 20B, ... 20N, the interface apparatus of the present invention. The process controllers 20, 20B, ... 20N, can initiate communication to the plant control network 11, or can communicate with any other process controller coupled to UCN 14, unlike the previous process controllers 20'. These previous process controllers 20' were slaved to the highway gateway (HG) 601 and could only communicate in response to a message from HG 601. Thus, the process controllers 20A, 20B, ... 20N, of the present invention provide for "peer-to-peer" communication.

Referring back to FIG. 2 it can be seen that the process controller 20 has a degree of flexibility not heretofore available. If the field devices for the particular process being controlled are all of an analog input type, the I/O modules 21A, 21B, 21C, 21D, can all be the same I/O module type; however, in the preferred embodiment of the present invention, the application specific circuit for the module 21 is changed to properly interface with the signal provided by the field device. In this manner, the process controller 20 is configurable to the field device configuration simply by inserting the correct module, i.e., the I/O module type being compatible with the field device. Thus, it can be readily seen that the architecture of the interface apparatus of the present invention allows the user the flexibility of configuring the system to the process being controlled simply by inserting the required I/O modules into slots allocated to receive the I/O modules without any electrical, mechanical, or physical changes to the interface apparatus.

While there has been shown what is considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

We claim:

1. In a process control system, having a plant control network for performing an overall supervision of a process being controlled, said plant control network having at least one external bus for operatively connecting a corresponding interface apparatus to said plant control network, and wherein each interface apparatus interfaces with at least one field device, each field device being a predetermined type, each interface apparatus comprising:

a) controller means, operatively connected to the external bus, for providing an interface between said plant control network and the field devices operatively connected to said interface apparatus, such that a control function of the field devices is provided, and commands are accepted from the plant control network and responded to, and status and history of the control function are reported on a predetermined basis to the plant control network, permitting the plant control network to perform its overall supervisory function said controller means including:
   i) first interface means, operatively connected to said external bus, for interfacing with the external bus to provide a communication link with the external bus in accordance with a first predetermined protocol;
   ii) communication means, operatively connected to said first interface means, for communicating with said plant control network via said first interface means;
   iii) control unit means, operatively connected to said communication means for performing control processing of the field devices connected to said interface apparatus based on data inputted from the input type field devices, the results of the control processing being outputted to predetermined ones of said output type field devices thereby achieving the control function of the process being controlled, the control unit mean further accepting commands from said plant control network and responds thereto, and reports status and history data of the process being controlled;
   iv) second interface means, operatively connected to said communication means and to said control unit means, for interfacing with an internal bus to provide a communication link with the internal bus in accordance with a second predetermined protocol; and
   v) global memory means, operatively connected to said first and second interface means, to said communication means and to said control unit means, for storing information common to said control unit means and to said communication means, and further providing communications between said control unit means and said communication means; and b) at least one input/output (I/O) module means, each I/O module means operatively connected to said controller means via the internal bus, and wherein each I/O module means interfaces with at least one field device, each I/O module means being of a first predetermined type including analog input (A/I) type, analog output (A/O) type, digital input (D/I) type, or digital output (D/O) type, each field device having associated therewith a second predetermined type including A/I, A/O, D/I, or D/O types, and wherein each field device having the second predetermined type is operatively connected to one of said I/O module means having a first predetermined type, such that the first predetermined type of said I/O module means and the second predetermined type of said field device are corresponding for obtaining data from or outputting data to input type field devices or output type field devices, respectively, thereby permitting data to flow between the controller means and the field devices thereby permitting said controller means to perform its control function.

2. An interface apparatus according to claim 1, wherein each I/O module means comprises:

a) transceiver means, operatively connected to said internal bus, for interfacing with the internal bus to provide a communication link with the internal bus in accordance with the second predetermined protocol;

b) microcontroller means, operatively connected to said transceiver means, for providing control of information flowing through the I/O module means, including preprocessing the information flowing through the I/O module means such that the information is in a predetermined form; and c) logic means, operatively connected to said microcontroller means, for interfacing with one of said predetermined types of field devices to provide data to the output field device from the microcontroller means or from the input field device to the microcontroller means in a predetermined format.

3. An interface apparatus according to claim 2, wherein the preprocessing of the information flowing through the I/O module means includes selected ones of zero drift, linearization, hardware correction, compensation, calibration corrections, limits checking, scaling, units conversion, and normalizing.

4. An interface apparatus according to claim 1, wherein the results of the control processing are stored in said global memory for subsequent output to predetermined ones of said output type field devices, subsequent output being performed under control of the communication means in response to a command from the control unit means thereby relieving the control unit means from an input/output management function.

5. In a process control system, having a plant control network for performing an overall supervision of a process being controlled, said plant control network having at least one external bus for operatively connecting a corresponding interface apparatus to said plant control network, and wherein each interface apparatus interfaces with at least one field device, each field device being a predetermined type, each interface apparatus comprising:

a) controlled means, operatively connected to the external bus, for providing an interface between said plant control network and the field device operatively connected to said interface apparatus, data being obtained from said field devices being transmitted to said plant control network such that a control function of the field devices is provided by the plant control network, further commands being accepted from the plant control network and responded to, and status and history of the control function are reported on a predetermined basis to the plant control network, permitting the plant control network to perform its overall said supervisory function and the control function, said controller means including:

i) first interface means, operatively connected to said external bus for interfacing with the external buses in accordance with a first predetermined protocol;

ii) communication means, operatively connected to said first interface means, for communicating with said plant control network via said first interface means;

iii) second interface means, operatively connected to said communication means for interfacing with an internal bus to provide a communication link with the internal bus in accordance with a second predetermined protocol; and iv) global memory means, operatively connected to said first and second interface means and to said communication means, for storing information from said field devices and said process control network, selected information being communicated between said field devices and said process control network thereby permitting said process control network to perform the control function; and b) at least one input/output (I/O) module means, each I/O module means operatively connected to said controller means via the internal bus, and wherein each I/O module means interfaces with at least one field device, each I/O module means being of a first predetermined type including analog input (A/I) type, analog output (A/O) type, digital input (D/I) type, or digital output (D/O) type, each field device having associated therewith a second predetermined type including A/I, A/O, D/I, or D/O types, and wherein each field device having the second predetermined type is operatively connected to one of said I/O module means having a first predetermined type, such that the first predetermined type of said I/O module means and the second predetermined type of said field device are corresponding for obtaining data from or outputting data to input type field devices or output type field devices, respectively, thereby permitting data to flow between the controller means and the field devices thereby permitting the control function to be performed.

* * * * *